(12) United States Patent
Gao et al.

(10) Patent No.: US 7,683,512 B2
(45) Date of Patent: Mar. 23, 2010

(54) MOTOR USED TO DRIVE OPTICAL ELEMENTS

(75) Inventors: Yun-Feng Gao, Shenzhen (CN);
You-Yong Liao, Shenzhen (CN);
Guang-Neng Wang, Shenzhen (CN);
Xiao-Hui Fu, Shenzhen (CN)

(73) Assignee: Shenzhen Han's Precision Mechatronics Co., Ltd., Shenzhen (CN)

( * ) Notice: Subject to any disclaimer, the term of this patent is extended or adjusted under 35 U.S.C. 154(b) by 102 days.

(21) Appl. No.: 11/915,985

(22) PCT Filed: Jul. 6, 2006

(86) PCT No.: PCT/CN2006/001588

§ 371 (c)(1),
(2), (4) Date: Nov. 29, 2007

(87) PCT Pub. No.: WO2007/137459

PCT Pub. Date: Dec. 6, 2007

(65) Prior Publication Data

US 2008/0203834 A1    Aug. 28, 2008

(30) Foreign Application Priority Data

May 29, 2006    (CN) .................... 2006 1 0035684

(51) Int. Cl.
*H02K 11/00*    (2006.01)

(52) U.S. Cl. ................................. 310/68 B
(58) Field of Classification Search ............... 310/68 B, 310/156.01, 12, 218
See application file for complete search history.

(56) References Cited

U.S. PATENT DOCUMENTS

| 7,097,399 | B2 * | 8/2006 | Winfough et al. | 409/32 |
| 7,291,945 | B2 * | 11/2007 | Nashiki | 310/49 R |
| 2004/0124733 | A1 * | 7/2004 | Yamamoto et al. | 310/218 |
| 2004/0239196 | A1 * | 12/2004 | Miura et al. | 310/77 |

FOREIGN PATENT DOCUMENTS

| CN | Y-2663923 | 12/2004 |
| CN | Y-2737056 | 10/2005 |
| JP | A-9-33655 | 2/1997 |

\* cited by examiner

*Primary Examiner*—Nguyen N Hanh
(74) *Attorney, Agent, or Firm*—Alan Kamrath; Kamrath & Associates PA

(57) ABSTRACT

A motor used to drive optical elements includes a stator, a rotor revolved relative to the stator, and a feedback apparatus used to sense the position of the rotor. The feedback apparatus is an encoder. Such described structure eliminates the system's instability caused by the drift of a conventional capacitive type transducer or an inductance type transducer. Moreover, the response of the motor used to drive optical elements has been improved greatly by utilizing a multipole motor.

9 Claims, 3 Drawing Sheets

MOTOR USED TO DRIVE OPTICAL ELEMENTS

BACKGROUND OF THE INVENTION

1. Field of the Invention

The present invention relates to a motor and, in particular, to a motor used to drive optical elements such as mirrors for the purpose of guiding light beams in laser markers, scanners or other systems which are similar to these.

2. The Related Art

A motor used to drive optical elements usually has a different structure and configuration. Traditionally, the position feedback apparatus of the motor used to drive optical elements utilizes a capacitive type transducer or an inductance type transducer. However, the accuracy, the repeatability and the stability of the motor are restricted greatly for the drift of the transducer. Moreover, the motor includes two magnetic poles, and the motor is supported by ball bearings. The motor's response/(the response of the motor) is restricted because of the small ratio of torque and inertia. Also, the running accuracy is influenced by the low axial stiffness.

SUMMARY OF THE INVENTION

An object of the present invention is to provide a motor used to drive optical elements which are controlled by an encoder so as to eliminate the instability of the system caused by the drift of the conventional transducer. At the same time, it is another object to improve the motor's capability so as to improve the system's response, positioning and repeatability.

In order to achieve such aims, the design of the invention will be described in the following paragraphs.

A motor used to drive optical elements comprises a stator, a rotor revolved relative to the stator, and a feedback apparatus used to sense the position of the rotor. The feedback apparatus is an encoder.

In a preferred embodiment, the encoder is a round encoder and the encoder includes an encoding disk droved by the rotor and a readheader cooperated to the encoding disk.

In another preferred embodiment, the encoder is a linear encoder and the encoder includes a linear scale mounted on the outer surface of a columnar seat which connects with the rotor and a readheader cooperated to the linear scale.

In a preferred embodiment, the readheader includes an emitter and a receiver.

In a preferred embodiment, the stator includes a magnetic yoke, a bobbin and a plurality of multipole coils set on the bobbin.

In a preferred embodiment the bobbin and the multipole coils are inserted into the magnetic yoke and shaped together by pouring epoxy resin.

In a preferred embodiment, the rotor is a multipolar rotor and includes a shaft, a plurality of bearings and a plurality of magnets whose polarities are arranged alternately on the shaft.

In a preferred embodiment, the shaft includes a main body which is made of a highly magnetic material and a pair of nonmagnetic extended portion which extend from the two end of the main body, the magnets are mounted on the main body.

In a preferred embodiment, the bearings are angular contact ball bearings and installed on the extended portion.

In a preferred embodiment, a pin is defined on one of the extended portions and lies on the outer side of the bearing.

As described hereinabove, the invention utilizes the encoder so as to eliminate the drift caused by the transducer and also utilizes the multipole motor to drive the load so that the load will move fast and smoothly. The capability of the system is improved greatly.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENTS

Figure 1:
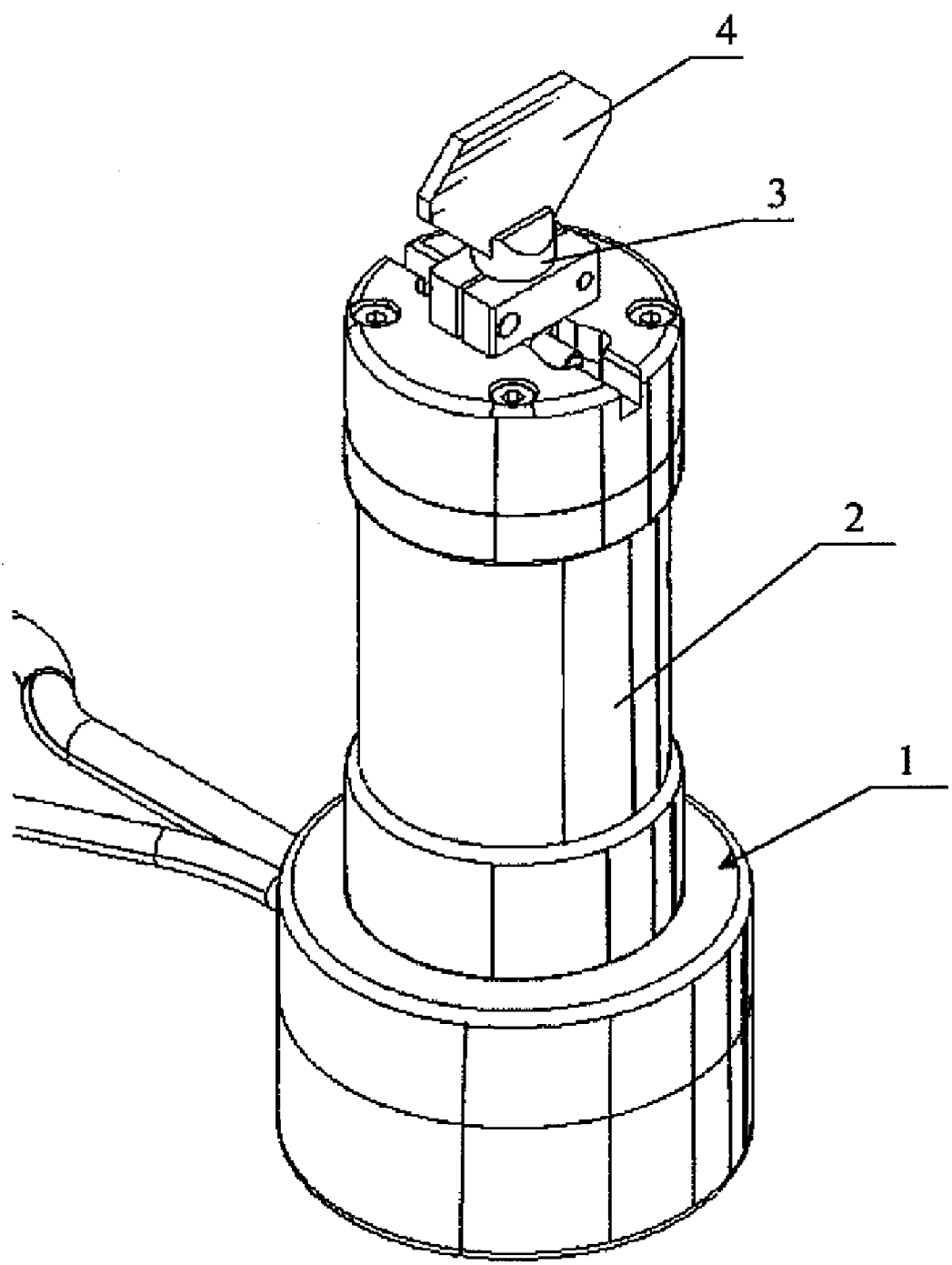
FIG. 1 is a perspective assembled view of a motor used to drive optical elements according to the invention.
Figure 2:
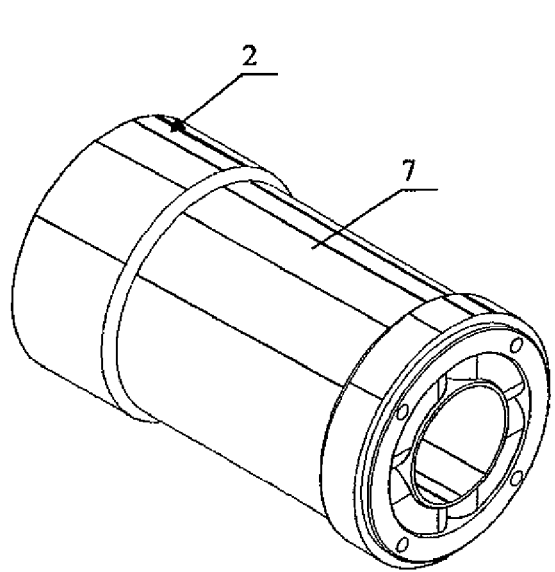
FIG. 2 is a perspective view of a stator of the motor used to drive optical elements according to the invention.
Figure 3:
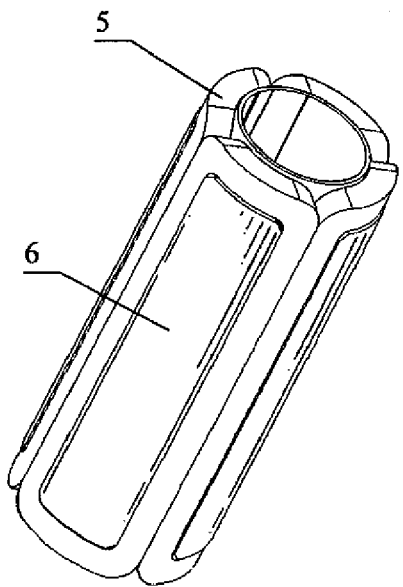
FIG. 3 is an assembled view of a bobbin and coils of the stator of the motor used to drive optical elements according to the invention.
Figure 4:
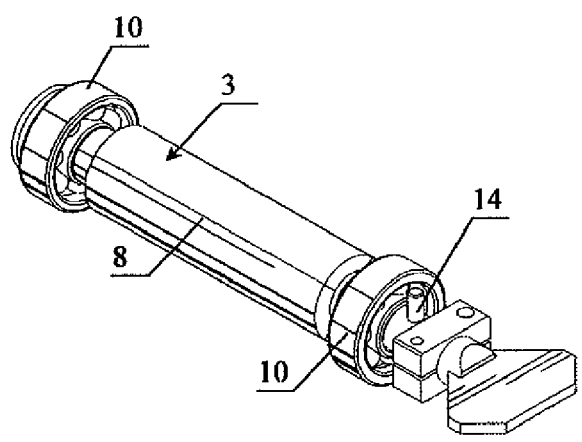
FIG. 4 is a perspective view of a rotor of the motor used to drive optical elements according to the invention.
Figure 5:
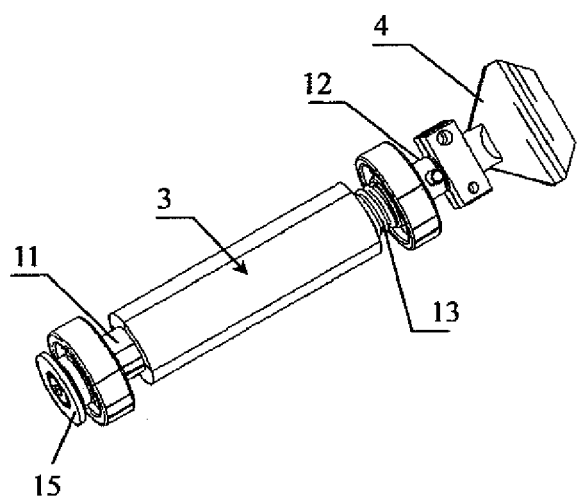
FIG. 5 is another view of the rotor of the motor used to drive optical elements according to the invention.
Figure 6:
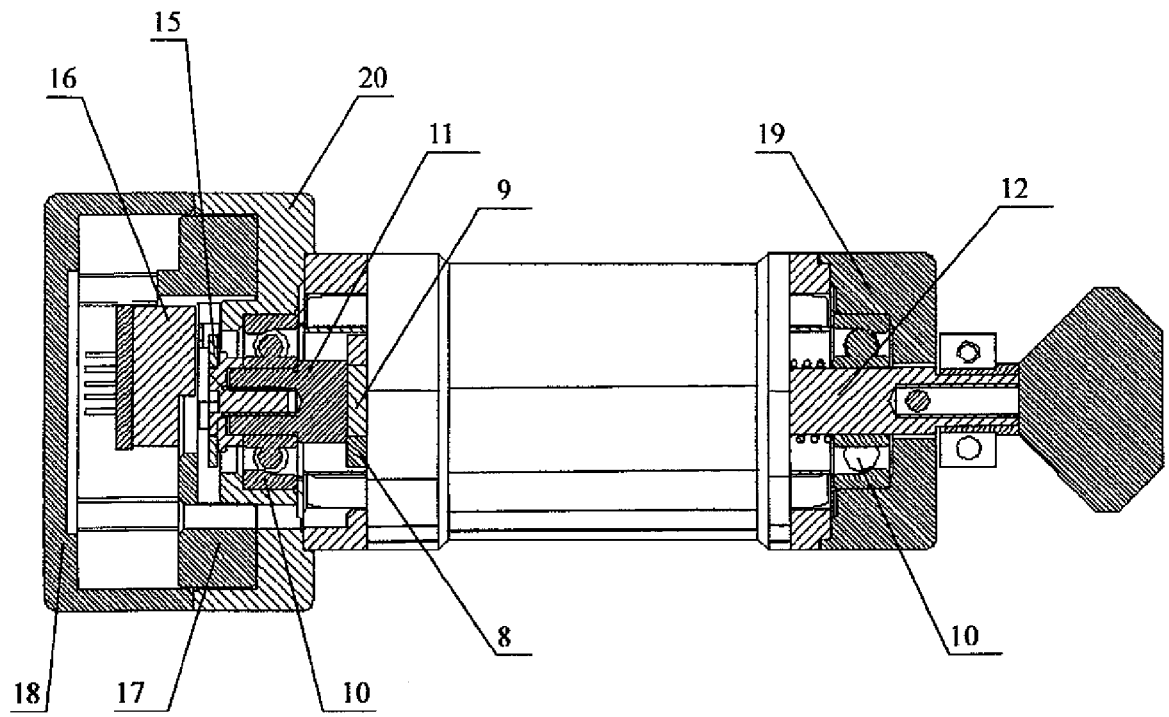
FIG. 6 is a sectional view of a position feedback apparatus of the motor used to drive optical elements in one embodiment according to the invention.

Detailed description will hereunder be given of the preferred embodiments of a motor used to drive optical elements according to the present invention with reference to the accompanying drawings.

As shown in FIG. 1 to FIG. 6, the motor 1 used to drive optical elements includes a stator 2 and a rotor 3 revolved relative to the stator 2. The stator 2 includes coils 5, a bobbin 6 and a magnetic yoke 7. The bobbin 6 is made of nonmagnetic material. A plurality of slots are defined on the bobbin 6. Each coil 5 is placed into the slot respectively after it is shaped, and the coils 5 form the motor winding by connection in a certain sequence. The coils 5 and the bobbin 6 are inserted into the magnetic yoke 7 and shaped together by pouring epoxy resin. The rotor 3 includes a plurality of magnets 8, a shaft 9 and a pair of bearings 10. The magnets 8, whose polarity is alternately arranged, are affixed on the shaft 9. The shaft 9 includes a main body (not shown in the FIGS.) which is covered by the magnets 8 and a pair of extended portions 11, 12 which extend from the two ends of the main body. The main body is made of a material which has a high magnetic permeability, and the extended portions 11, 12 are made of nonmagnetic material. The bearings 10 are angular contact ball bearings and installed on the extended portions 11, 12. A spring 13 is installed on the extended portion 12 and lies on the inner side of the bearing 10 so as to provide a constant preload. A load 4 (mirror) is installed on the extended portion 12 too. A pin 14 is defined on the extended portion 12 and lies on the outer side of the bearing 10 so as to limit the rotating angle of the motor 1. The rotor 3 and the stator 2 are oriented accurately by bearing pedestals 19, 20 of the bearings 10.

The magnetic field of the rotor 3 interacts with the stator 2 and will produce a torque when the stator 2 is energized so that the rotor 3 drives the load 4 rotating in the stator 2. When the stator 2 is energized with alternating current, the rotor 3 will rotate reciprocally in the stator 2.

An encoder is a round encoder in this embodiment. The encoder includes an encoding disk 15 installed on the extended portion 11 and driven by the shaft 9 and a readheader 16 cooperated to the encoding disk 15. The gap between the readheader 16 and the encoding disk 15 is adjusted by an encoding seat 17 and the bearing pedestal 20 and is also protected by an end shield 18. The encoding disk 15 is grated uniformly. A luminous organ (infrared light emitting diode) installed on the readheader 16 emits light to the surface of the encoding disk 15, and the light is reflected to the receiver of the readheader 16. A position signal of the motor 1 is picked off by the receiver of the readheader 16. The motion of the rotor 3 or the load 4 is precisely controlled by a feedback control system which consists of the encoder.

Figure 7:
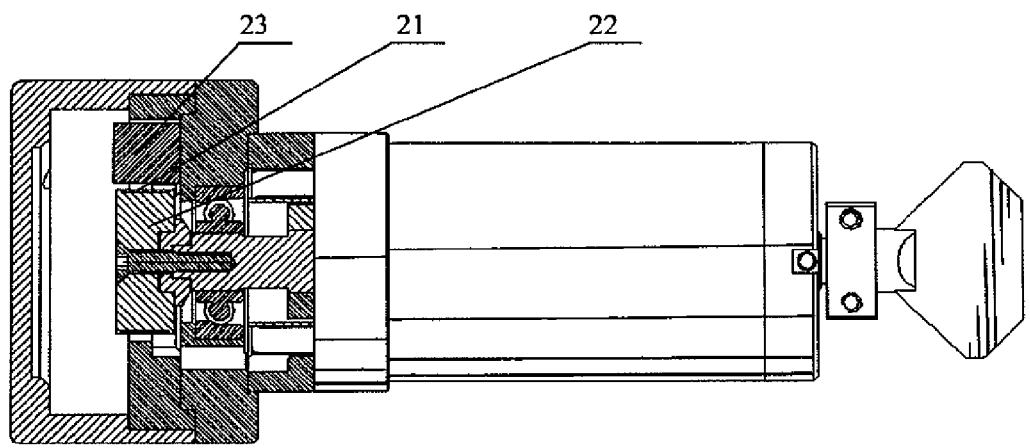
FIG. 7 is a sectional view of the position feedback apparatus of the motor used to drive optical elements in another embodiment according to the invention.

FIG. 7 is a sectional view of the feedback apparatus of the motor 1 used to drive optical elements in another embodiment according to the invention. The encoder is a linear encoder in this embodiment. The encoder includes a linear scale 21 mounted on the outer surface of a columnar seat 22 which connects with the extended portion 11 and a readheader 23 cooperated to the linear scale 21. The angular position of the rotor 3 is measured by the readheader 23 on the radial direction.

The motor used to drive optical elements according to the invention utilizes such described structure so as to eliminate the system's instability caused by the drift of the conventional capacitive type transducer or an inductance type transducer. Moreover, the response of the motor 1 used to drive optical elements has been improved greatly by utilizing a multipole motor 1.

The motor 1 used to drive optical elements described above utilizes a multiple pole stator 2 consisting of a multiple pole winding and a multiple pole rotor 3 consisting of a plurality of magnets. In fact, the stator 2 and the rotor 3 can also be two poles if the motor 1 satisfies the system requirements.

It is to be understood, however, that even though numerous, characteristics and advantages of the present invention have been set forth in the foregoing description, together with details of the structure and function of the invention, the disclosed is illustrative only, and changes may be made in detail, especially in matters of shape, size, and arrangement of parts within the principles of the invention to the full extent indicated by the broad general meaning of the terms in which the appended claims are expressed.

What is claimed is:

1. A motor used to drive optical elements comprising: a stator; a rotor revolved relative to the stator; and a feedback apparatus used to sense the position of the rotor, the feedback apparatus is an encoder, wherein the encoder is a linear encoder and the encoder includes a linear scale mounted on the outer surface of a columnar seat which connects with the rotor and a readheader cooperated to the linear scale.

2. The motor used to drive optical elements as claimed in claim 1, wherein the readheader includes an emitter and a receiver.

3. The motor used to drive optical elements as claimed in claim 2, wherein the stator includes a magnetic yoke, a bobbin and a plurality of coils set on the bobbin.

4. The motor used to drive optical elements as claimed in claim 3, wherein the bobbin and the plurality of coils are inserted into the magnetic yoke and shaped together by pouring epoxy resin.

5. The motor used to drive optical elements as claimed in claim 4, wherein the rotor includes a shaft, a plurality of bearings and a plurality of magnets whose polarity is alternately arranged on the shaft.

6. The motor used to drive optical elements as claimed in claim 5, wherein the shaft includes a main body which is made of a highly magnetic material and a pair of nonmagnetic extended portions which extend from two ends of the main body, wherein the plurality of magnets are mounted on the main body.

7. The motor used to drive optical elements as claimed in claim 6, wherein the plurality of bearings are angular contact ball bearings and installed on the pair of nonmagnetic extended portions.

8. The motor used to drive optical elements as claimed in claim 7, wherein a pin is defined on one of the pair of nonmagnetic extended portions and lies on the outer side of the bearing installed on the one of the pair of nonmagnetic extended portions.

9. The motor used to drive optical elements as claimed in claim 6, wherein a pin is defined on one of the pair of nonmagnetic extended portions and lies on the outer side of the bearing installed on the one of the pair of nonmagnetic extended portions so as to limit a rotation angle of the motor.

* * * * *